Feb. 16, 1954 L. E. NORTON 2,669,693

WIDE-BAND MODULATION OF FREQUENCY-STABILIZED OSCILLATORS

Filed May 12, 1950 3 Sheets-Sheet 1

INVENTOR
Lowell E. Norton
BY J. L. Whittaker
ATTORNEY

WIDE-BAND MODULATION OF FREQUENCY-STABILIZED OSCILLATORS

Filed May 12, 1950 3 Sheets-Sheet 2

INVENTOR
Lowell E. Norton
BY J. L. Whittaker
ATTORNEY

INVENTOR
Lowell E. Norton
BY J. L. Whittaker
ATTORNEY

Patented Feb. 16, 1954

2,669,693

UNITED STATES PATENT OFFICE 2,669,693

WIDE-BAND MODULATION OF FREQUENCY-STABILIZED OSCILLATORS

Lowell E. Norton, Princeton, N. J., assignor to Radio Corporation of America, a corporation of Delaware Application May 12, 1950, Serial No. 161,507

7 Claims. (Cl. 332—19)

This invention relates to methods and systems particularly suited for wide-band modulation of oscillators which are frequency-stabilized by servo systems.

In my co-pending applications, Serial Nos. 115,698, filed September 14, 1949, now Patent No. 2,631,269, issued March 10, 1953, and 135,780, filed December 29, 1949, there are disclosed methods and arrangements for modulating oscillators which are frequency-stabilized by servo loops of various types disclosed in other co-pending applications including Serial Nos. 35,185, filed June 25, 1948, now Patent No. 2,584,608 issued February 5, 1952, 49,934, filed September 18, 1948, now Patent No. 2,602,897, issued July 8, 1952, and 5,603, filed January 31, 1948, now Patent No. 2,559,730 issued July 10, 1951. The modulating systems and methods herein disclosed and claimed are in some respects of generally like character but are especially suited for transmission of television, facsimile and other signals requiring wide-band modulation of the carrier frequency.

In accordance with the present invention, the wide range of frequency modulation rates required for wide-band modulation are effected, without impairment of the rigid stabilization of the mean carrier frequency and without distortion of the modulation, by varying, in accordance with the modulating signal, both the reference frequency used for stabilization and the potential of a frequency-control electrode of the oscillator tube or a reactance tube associated therewith in the oscillator system. More specifically, the frequency modulation of the carrier is made proportional to the incremental change in the standard frequency or to the incremental potential change of the frequency-control electrode by applying the modulating signal to vary both the reference frequency and the electrode potential in a proportion which is fixed for the varying amplitude of the modulating signal and which is uniquely defined by transfer factors respectively of the oscillator system and the frequency-error detector of the servo loop, the numerical value of the proportionality factor depending upon which of the two types of proportional modulation is desired.

More particularly, in stabilized microwave generator systems in which a confined body of molecularly resonant gas serves as the frequency standard, the modulating signal is applied to a Stark electrode in the gas to shift the molecularly resonant frequency in accordance with the modulation and is also applied effectively in series with the output of the error detector to a frequency-control electrode of the oscillator system or tube.

The effects of Stark field electrodes, herein termed "Stark electrodes" are described in an article entitled "Resolution of a rotational line of the OCS molecule and its Stark effect," by T. W. Dakin et al., Physical Review, vol. 70, October 1946, page 560.

The invention further resides in methods and systems having the features of novelty and utility hereinafter described and claimed.

For a more detailed understanding of the invention, reference is made to the accompanying drawings, in which.

Figures 1, 1A, 2:
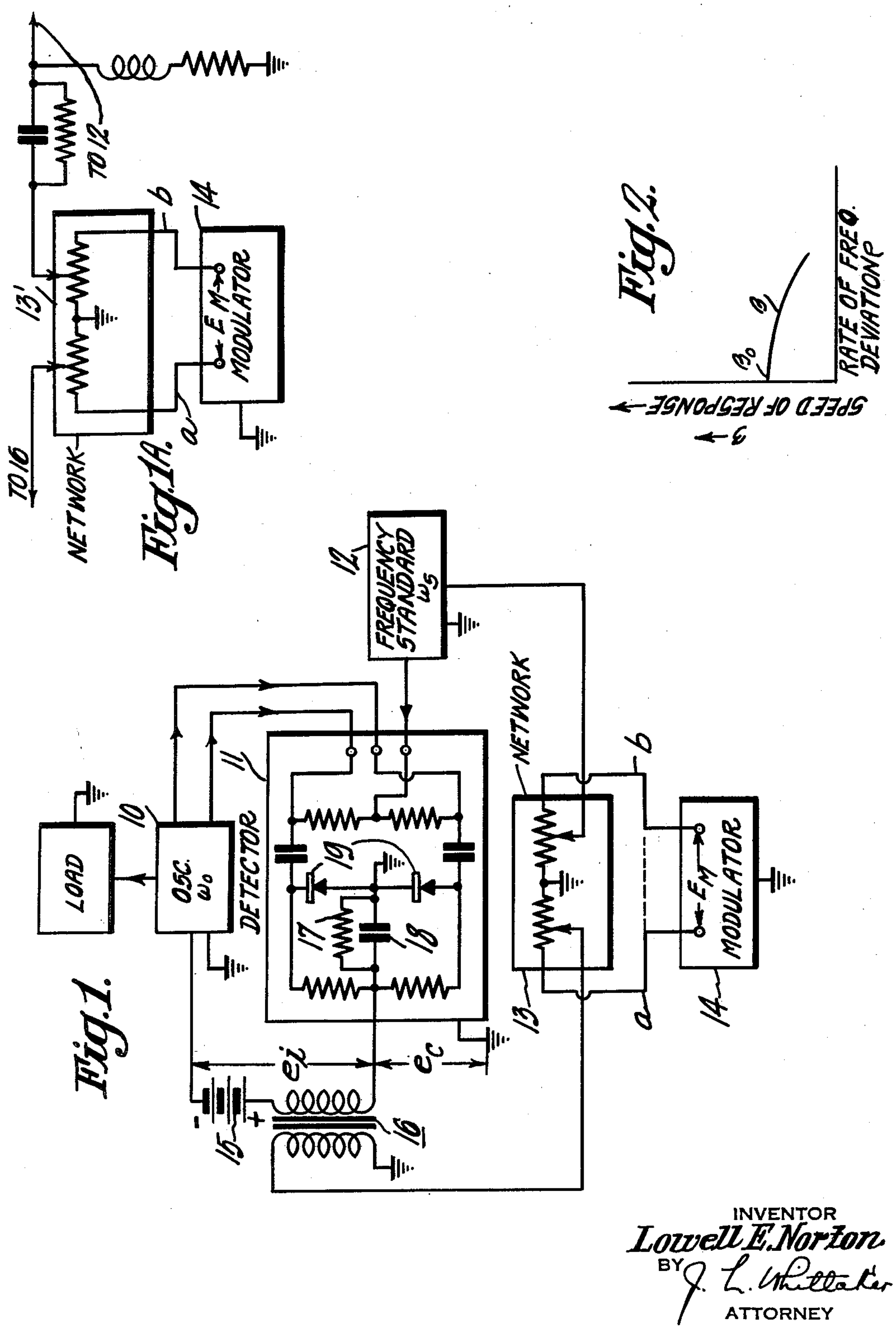
Figs. 1 and 1A are block diagrams of the basic frequency-stabilized, frequency-modulated oscillator system of the invention.
Figs. 2 and 3 are explanatory figures referred to in discussion of Figs. 1, 5 and 6.

Referring to Fig. 1, the carrier frequency $\omega_0$ of an oscillator 10 is stabilized by the output voltage $e_c$ of an error detector 11 which compares the oscillator frequency with the frequency $\omega_S$ of a standard 12 which may be a cell containing a molecularly resonant gas, a high gas Q circuit element, or a source of standard frequency voltage, depending upon the particular stabilizing arrangement used. By way of example and for purpose of explanation, the oscillator 10 may be, as in my aforesaid co-pending applications and other applications referred to herein, a klystron or other microwave generator, and the frequency standard may be a confined body of ammonia or other gas exhibiting molecular resonance at microwave frequencies. Also for purposes of explanation, it is assumed the operating voltages applied to the oscillator are constant except for a voltage $e_i$ applied to a frequency-control electrode of the oscillator, ordinarily the reflector anode in the gas of a reflex klystron. For lower frequency oscillators, the frequency-control electrode may be that of a reactance tube included, in manner known per se, in the oscillator system.

The dimensional transfer factor $\mu$ of the oscillator may be defined as:

$$\mu=\frac{\omega_0}{e_i} \quad (1)$$

The dimensional transfer factor $\beta$ of the error detector 11, which may be of type disclosed in my co-pending applications, may be defined as:

(2)
$$\beta=\frac{e_c}{\omega_0-\omega_s}$$

where the control-voltage $e_c$, as more fully discussed in my copending application, is of polarity or sense dependent upon the algebraic sign of the difference between the frequencies $\omega_0$, $\omega_s$.

For frequency stabilization purposes, the error voltage $e_c$ is applied to the frequency-control electrode to oppose departure of the oscillator frequency $\omega_0$ from the standard frequency $\omega_s$, the frequency-stabilizing conditions of the servo loop being expressed as:

(3)
$$\omega_0=\mu[e_i-\beta(\omega_0-\omega_s)]$$

Otherwise stated, the output frequency of the oscillator is (4)
$$\omega_0=\frac{\mu}{1+\mu\beta}e_i+\frac{\mu\beta}{1+\mu\beta}\omega_s$$

Figures 3, 5:
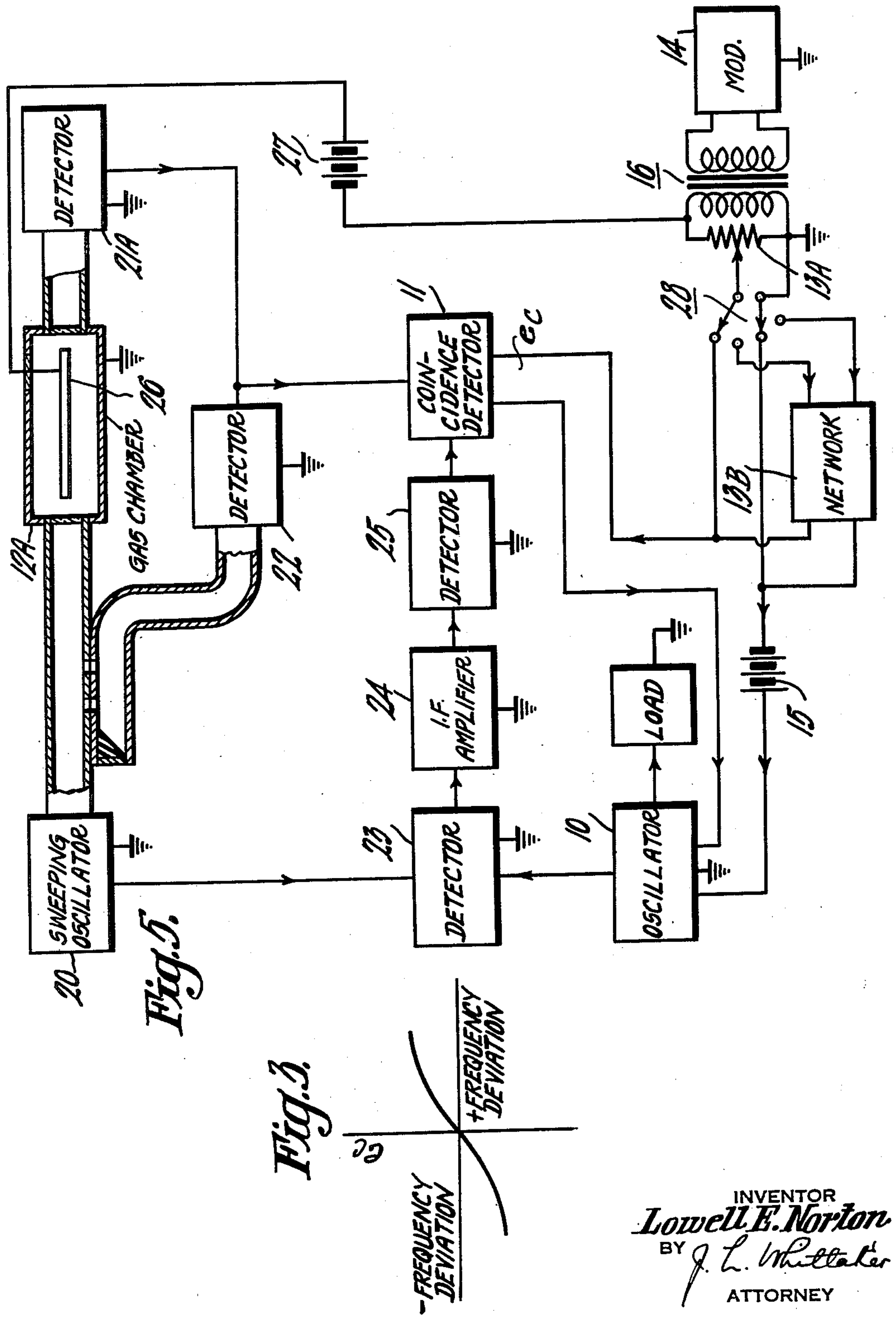
Figs. 5 and 6 are block diagrams of two specific embodiments of the system of Fig. 1.

To provide a control voltage $e_c$ which is of opposite polarity for positive and negative deviations of the mean oscillator frequency, it is necessary that the detector 11 include a rectifier and a filter generically represented in Fig. 1 by the crystal rectifiers 19, resistor 17 and capacitor 18. Therefore, the transfer factor $\beta$ will ordinarily decrease with increasing rate of frequency deviation, as illustrated in Fig. 2, with consequent decrease in the rate of increase of the control voltage $e_c$ as shown in Fig. 3. The transfer factor $\beta$ of the detector 11 may therefore be expressed as (5)
$$\beta=\frac{\beta_0}{\sqrt{1+(R\rho C)^2}}$$

where $\beta_0$ is the zero error frequency value of $\beta$,
R and C are the resistance and capacitance values of the filter 17, 18, and
$\rho$ is the rate of frequency deviation.

From Equation 4, it appears that variation in either or both of the parameters $e_i$ and $\omega_s$ in accordance with a modulating signal $E_M$ will effect frequency modulation of the oscillator 10. If the modulating signal is applied to vary only the potential $e_i$ of the frequency-control electrode, the relation between the time derivative of that potential and the oscillator frequency may be expressed as (6)
$$d\omega_0=\frac{\mu}{1+\mu\beta}dei$$

whereas, if the modulating signal is applied to vary only the standard frequency $\omega_s$, the time derivatives of the oscillator frequency and the standard frequency may be expressed as (7)
$$d\omega_0=\frac{\mu\beta}{1+\mu\beta}d\omega_s$$

With the modulating signal applied, in accordance with the present invention, concurrently to vary both the reference frequency and the potential of the frequency-control electrode, the total incremental change in oscillator frequency is (8)
$$(d\omega_0)_T=\frac{\mu de_i+\mu\beta d\omega_s}{1+\mu\beta}$$

In practice, the incremental changes in $e_i$ and $\omega_s$ should not be made so extremely large that the oscillator changes its mode with resultant discontinuity of $\mu$ and $\beta$ during modulation: neither should the modulation swing be so extremely large that $\mu$ and $\beta$ lose their character of simple transfer factors. Within the wide limits of oscillator frequency for which $\mu$ and $\beta$ are simple transfer factors and are not discontinuous, the modulating signal may be applied in accordance with Equation 8 to effect wide-band modulation of the carrier.

In order that the resulting modulation $(d\omega_0)_T$ shall be proportional to the modulation component $(de_i)$ of the frequency-control electrode potential and shall also be independent of the modulation rate, the modulation $(d\omega_0)_T$ should be independent of $\beta$ if simple resistive networks are to be used because this parameter depends upon the rate of modulation.

To obtain such proportionality and independence, the relation between the modulation and the potential of the frequency-control electrode must be expressible as (9)
$$(d\omega_0)_T=Mde_i$$

where M is the proportionality constant and hence, from Equation 8:

(9a)
$$Mde_i=\frac{\mu e_i+\mu\beta d\omega_s}{1+\mu\beta}$$

Hence,

(10)
$$d\omega_s=\left[\frac{M+\mu(\beta M-1)}{\mu\beta}\right]de_i$$

For the simplest case in which $M=1$:

(11)
$$d\omega_s=\frac{1+\mu(\beta-1)}{\mu\beta}de_i$$

For normal values of $\mu$, $\beta$ constants Equation 11 reduces to (11A)
$$d\omega_s=\left[\frac{1}{\mu}+\frac{\beta-1}{\beta}\right]de_i\approx\frac{-de_i}{\beta}$$

In the system diagrammatically shown in Fig. 1, both $\omega_s$ and $e_i$ are varied by the modulating signal $E_M$. However, since only resistances are used in network 13, the requirement of Equation 11A that modulation to $e_i$ must be modified by the factor $$-\frac{1}{\beta}$$

upon application to $\omega_s$ cannot be met. As shown in Fig. 2, $\beta$ ordinarily has a decreasing characteristic with increasing modulation rate $\rho$, so the modulator and simple resistive network 13 of Fig. 1 must be replaced by the modulator and network 13′ which has a rising characteristic with rate $\rho$ to conform with the $$-\frac{1}{\beta}$$

requirement. In this case, potentials at $a$ and $b$ in Fig. 1A will normally be in phase opposition.

The total incremental frequency modulation $(d\omega_0)_T$ may, in a preferred method, be made proportional to $d\omega_s$— instead of $de_i$:. In such alternative case (11B)
$$(d\omega_0)_T=\frac{\mu e_i+\mu\beta d\omega_s}{1+\mu\beta}=Qd\omega_s$$

where Q is the proportionality factor and, hence

(12)
$$de_i=\left[\frac{\mu\beta(Q-1)+Q}{\mu}\right]d\omega_s$$

For the simplest case in which Q=1:

(13)
$$de_i=\frac{d\omega_s}{\mu}$$

Since $\mu$ is substantially independent of modulation rate $\rho$ the system of Fig. 1 with simple resistive network 13 may be used. In the system diagrammatically shown in Fig. 1, both $\omega_s$ and $e_i$ are varied by the modulating signal $E_M$ in accordance with the general relationship expressed in Equation 10, and by proper adjustment of network 13 may be varied in accordance with the particular relationship expressed in Equation 13. The network 13 is shown as exemplary of arrangements for applying the modulating signal $E_M$ to vary the parameters $e_i$ and $\omega_s$: in the particular form shown, network 13 is a double potentiometer in the output circuit of a modulator 14 of any suitable known type. The adjustable contacts of the two potentiometers or slidewires may be ganged for adjustment of unison to obtain the desired proportionality factor of the modulating signal as applied respectively to vary the reference frequency and the potential of the control electrode. Potentials at $a$ and $b$ will normally be in phase. The transfer constants of the oscillator and of the detector being known or determinable in any particular installation, the circuit constants of network 13 may be chosen by one skilled in the art to satisfy the relationships defined in Equations 12 and 13 and so obtain this novel method of wide-band modulation of a stabilized oscillator.

Thus when, in the system of Fig. 1, both $e_i$ and $\omega_s$ are varied according to the relationship expressed in Equation 11, or to the preferred special case Equation 13, the incremental frequency shift or modulation will be directly proportional to the incremental change of the reference frequency and will be independent of the rate of modulation. Thus, in both methods, although the transfer factor is dependent upon the rate of modulation, simultaneous application of the modulation to the reference frequency and to the frequency control electrode makes the resultant frequency modulation independent of the rate of modulation and the resulting frequency-modulation of the oscillator carrier is proportional to the amplitude of the modulating signal.

As illustrative of application of the invention to a frequency-stabilized oscillator system of a type disclosed in copending application Serial No. 4,497, reference is made to Fig. 5. In brief description of the servo system for stabilizing oscillator 10, the frequency of a second oscillator 20 is repeatedly swept over a range including the frequency at which ammonia or other gas confined in a cell 12A exhibits molecular resonance. The output of oscillator 20 is transmitted as by a wave guide or other suitable transmission line to the gas cell so that in each sweep cycle of oscillator 20 the output of the gas cell, as demodulated by a rectifier 21A of any suitable type, includes a sharp pulse occurring as the sweeping frequency passes through the resonant frequency of the gas. The series of pulses so produced is impressed upon one input circuit of detector 11. As one way of effectively cancelling other than the pulse output of cell 12A, there may be used a second rectifier 22 connected as by a directional coupler to oscillator 20 in advance of the cell 12A.

The outputs of the oscillators 10 and 20 are impressed upon a mixer 23 jointly to produce a varying beat or difference-frequency which is subjected to the relective action of a filter or equivalent frequency-discriminating amplifier network 24 so that in each sweep cycle of oscillator 20, the output of the network 24 as demodulated by rectifier 25 includes a pulse occurring as the beat frequency passes through a particular value $\omega_f$ determined by characteristics of the filter 24: $\omega_f$ may be zero for a low-pass filter or a finite value for a resonant filter as discussed in aforesaid applications. This second series of pulses is also impressed upon the error detector 11. As more fully explained in various of aforesaid applications, when the two series of pulses occur in coincidence or in predetermined fixed time relation, the output voltage $e_c$ of the phase or coincidence detector 11 is zero. However, upon deviation of the frequency of oscillator 10 from the reference frequency ($\omega_s$ plus $\omega_f$; or $\omega_s$ minus $\omega_f$), the output of the detector 11 is of one sense or the other depending upon the sense of the frequency deviation, and is of magnitude corresponding with the deviation. Also as more fully explained in aforesaid applications, this control voltage is applied to the oscillator tube or to a control tube associated therewith in proper sense to bring the oscillator frequency back to the reference value.

In accordance with the present invention, to frequency-modulate the oscillator 10 so stabilized by the two-channel servo system including the gas cell in one channel and the low-frequency filter amplifier 24 in the other channel, the modulating signal is applied to vary the frequency at which the gas in cell 12A exhibits molecular resonance and is also applied effectively in series with the control voltage $e_c$ to the frequency-control electrode of the oscillator system.

Specifically, the gas cell 12A is provided with a Stark electrode 26. The battery 27 or equivalent direct current source is connected in circuit with the Stark electrode for production in the gas chamber of a direct-current field. The Stark electrode is also connected in circuit, as by transformer 16 or other coupling means, with the source 14 of the modulating signal for production within the gas chamber of an alternating field corresponding in frequency and amplitude with the modulating signal. The intensity of the direct-current field of the electrode is substantially greater than the peak values of the modulating field. For the second order Stark effect in ammonia, the Stark frequency shift is about 12 megacycles for a field of 250 volts per centimeter. For a typical klystron operating in the K-band range, the transfer factor $\mu$ is about 20 megacycles per volt. If the gas chamber 12A is a K-band wave guide with a height of 0.4 centimeter, then for this example, if the maximum swing frequency of the modulated signal is 12 megacycles, the actuating Stark voltage is 100 volts, and the corresponding incremental change of the frequency electrode potential should be 0.6 volt. Accordingly, the ratio of the incremental Stark voltage to the incremental reflector voltage must be 167 for this typical case. Such ratio between the two incremental voltages is obtained by adjustment of the contact of the potential divider or potentiometer 13A to the corresponding setting.

Figure 4A:
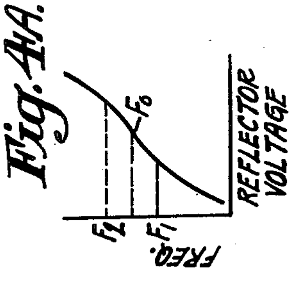
Figs. 4A and 4B are curves typical of the frequency/voltage characteristic of different types of microwave oscillator tubes.
Figure 4B:
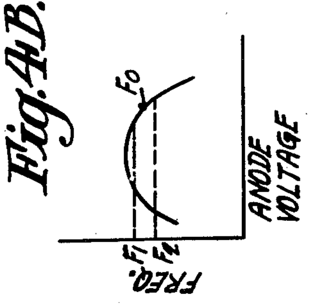

If it is desired to operate over a wider range of frequency-modulation swings (beyond the limits $F_1$, $F_2$ of Figs. 4A and 4B), a suitable nonlinear network 13B should be switched into the circuit, as by switch 28, to compensate for the curvature of the reflector voltage/klystron frequency characteristic (Fig. 4A) or of the anode-voltage/frequency characteristic of a magnetron (Fig. 4B).

Instead of applying the modulation to a Stark electrode as in Fig. 5 to introduce incremental changes in the reference frequency, the same effect may be obtained by causing incremental delay, or incremental voltage, in the input to the phase or coincidence detector of the two-channel system, as disclosed in my aforesaid applications, Serial Numbers 115,698 and 135,780. In the latter case, of course, the proper proportion of the modulating signal is also injected, as by network 13A, effectively in series with the output of the coincidence detector so independently and concurrently to effect an incremental change in the potential of the frequency-control electrode. In general, it is only necessary for the voltages causing the delay and the voltages on the reflector or other frequency-control electrode to be in the proper ratio, or for the voltage causing the detector differential voltage and the reflector voltage to be in the ratio defined by Equation 13.

Figure 6:
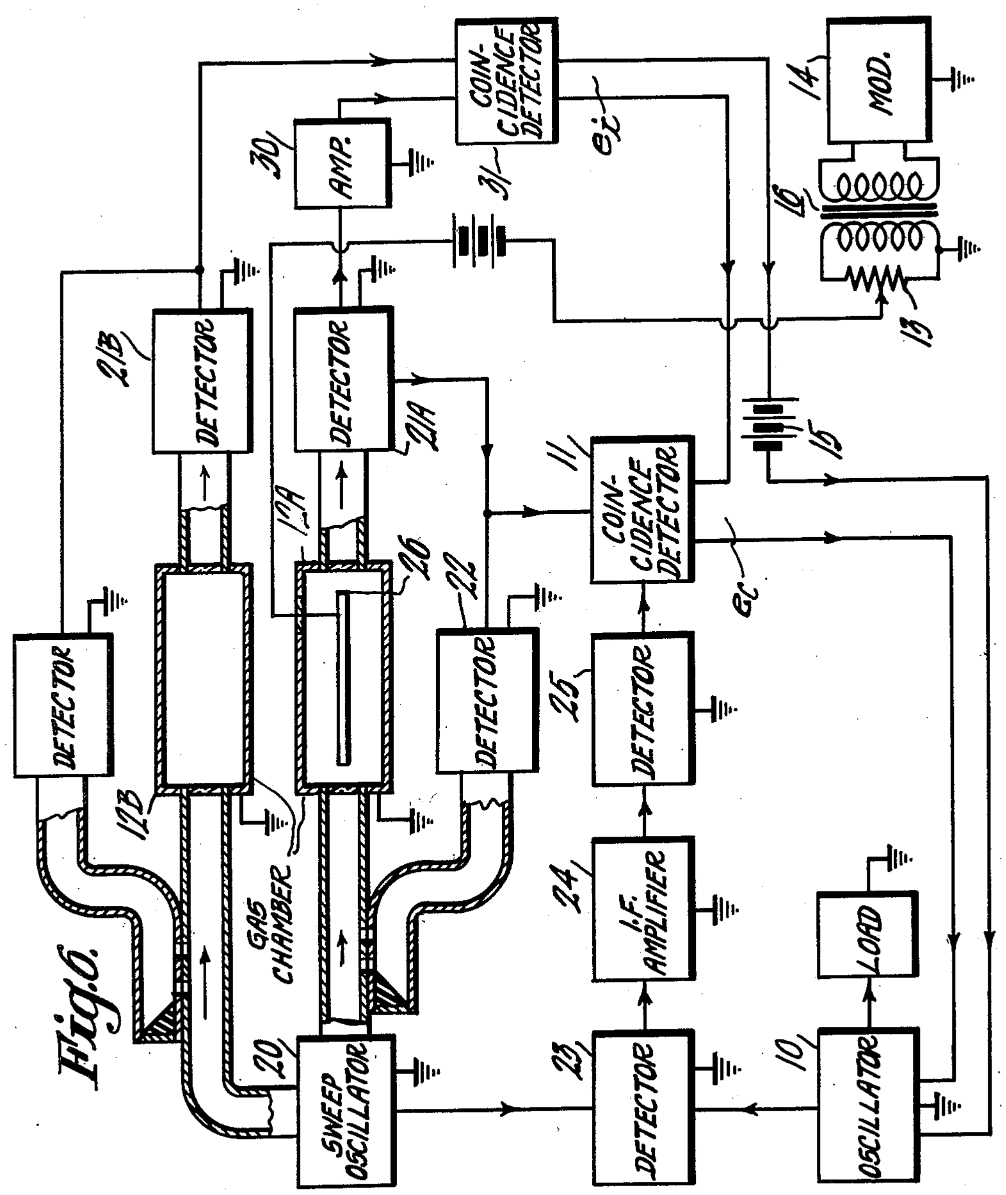

By using two gas cells, one with a Stark electrode whose field is modulated as in Fig. 5, and one without a Stark electrode and in circuit with a second phase detector, thereby may be automatically obtained the required incremental reflector voltage. Such an arrangement is shown in Fig. 6 in which the elements corresponding with elements of Fig. 5 are identified by the same reference characters. The frequency-stabilization in Fig. 6 is effected in the same way as in Fig. 5, and hence description of the stabilization need not be repeated. The system of Fig. 6 differs from that of Fig. 5 in that the output frequency of the sweep oscillator 20 is applied to a second gas chamber 12B containing gas exhibiting molecular resonance at the same frequency as the gas in cell 12A. Thus, the output of the second gas chamber 12B, as demodulated by rectifier 21B, consists of a series of pulses, each occurring as the frequency of oscillator 20 passes through the fixed reference frequency of this standard. This series of pulses is impressed upon one input circuit of detector 31 which may be similar to detector 11. The series of pulses produced by demodulation of the output of the first gas chamber 12A is applied, as through amplifier 30, upon a second input circuit of the detector 31. Thus, the output $e_i$ of detector 31 is zero for zero value of the modulating signal. When, however, the modulating signal as applied to the Stark electrode 26 of the first gas chamber 12A shifts the absorption frequency of the gas in cell 12A, the phase relations of the two series of pulses applied to detector 31 are shifted in accordance with the modulation and the output voltage $e_i$ of detector 31 accordingly varies with the frequency shift caused by the modulating potential $E_M$. The output voltages of the two detectors 11 and 31 are applied in series to the reflex anode or other frequency-control electrode of oscillator 10.

Thus in both the systems of Figs. 5 and 6, the method of modulation is that generally defined by Equation 8 and specifically defined by Equation 13.

It should be understood that the invention is not limited to modulation of the output frequency of klystron or other microwave oscillators, but is applicable to any servo stabilized oscillator for wide-band modulation thereof.

What is claimed is:

1. In a frequency-stabilized oscillator system comprising an electronic tube having an electrode whose potential affects the oscillator frequency $\omega_0$ in accordance with a transfer factor $\mu$, a feedback loop including a detector having a transfer factor $\beta$, and a standard of frequency $\omega_s$ coupled to said detector for production of a feedback potential applied to said electrode to affect the oscillator frequency $\omega_0$ in accordance with the relation $$\frac{\mu}{1+\mu\beta}e_i+\frac{\mu\beta}{1+\mu\beta}\omega_s$$

a method of frequency-modulating the stabilized oscillator which comprises simultaneously and independently varying said electrode potential and the standard frequency in accordance with a modulating signal to effect an incremental change $(d\omega_0)_T$ of the oscillator frequency which corresponds with $$\frac{\mu de_i+\mu\beta d\omega_s}{1+\mu\beta}$$

wherein $de_i$ and $d\omega_s$ are respectively the incremental changes of the electrode potential and the standard frequency.

2. A method as defined in claim 1 in which the ratio $$\frac{d\omega_s}{de_i}$$

corresponds with $$\frac{M+\mu(\beta M-1)}{\mu\beta}$$

wherein M is a proportionality constant so to insure that the frequency modulation is proportional to the modulation component $(de_i)$ of said electrode potential and is independent of the rate of modulation.

3. A method as defined in claim 2 in which the proportionality factor is unity.

4. A method as defined in claim 1 in which the ratio $$\frac{de_i}{d\omega_s}$$

corresponds with $$\frac{\mu\beta(Q-1)+Q}{\mu}$$

wherein Q is the proportionality constant so to insure that the frequency modulation is proportional to the modulation component $(d\omega_s)$ of the standard frequency.

5. A method as defined in claim 4 in which the ratio $$\frac{de_i}{d\omega_s}$$

is substantially equal to the reciprocal of the transfer factor $\mu$.

6. A system for frequency-stabilizing and frequency-modulating the carrier of an oscillator including an electronic tube whose potential $(e_i)$ affects the oscillator frequency $(\omega_0)$ in accordance with a transfer factor $(\mu)$ which comprises a feedback loop from the output system of said oscillator to said electrode, a frequency-error detector in said loop and including a resistance-reactance network having a transfer factor $(\beta)$, a source of standard frequency $(\omega_s)$ coupled to said detector for production of a feedback potential applied to said electrode to affect the oscillator frequency in accordance with the relation $$\omega_0=\frac{\mu}{1+\mu\beta}e_i+\frac{\mu\beta}{1+\mu\beta}\omega_s$$

and modulating means for simultaneously varying said potential and the standard frequency in accordance with a modulating signal to such extents $(de_i$ and $d\omega_s)$ that the incremental change $(d\omega_0)_T$ of the oscillator frequency corresponds with $$\frac{\mu de_i + \mu\beta d\omega_s}{1+\mu\beta}$$

7. A frequency-stabilized, frequency modulated oscillator system comprising an oscillator to be stabilized and modulated, a frequency standard, a detector for producing a frequency-control voltage for said oscillator, a sweep oscillator repeatedly sweeping a range including the standard frequency, means for producing and applying to said detector a series of pulses each occurring as the sweeping frequency passes through the frequency of said standard, means for producing and applying to said detector a second series of pulses each occurring as the beat frequency of said oscillators passes through a predetermined value, the phase relation of the two series of pulses determining the sense and magnitude of said frequency-control voltage, a modulator, means for applying the output of said modulator to shift the phase relation of said two series of pulses in accordance with the amplitude of the modulator output, means for concurrently applying the modulator output effectively in series with said frequency-control voltage, the variation of the standard frequency with modulation being effected by applying the modulator output to vary the Stark Effect in a a confined body of molecularly-resonant gas serving as the frequency-standard, and a second body of molecularly resonant gas connected to be swept by said sweep oscillator, a second detector, means for impressing on said second detector the demodulated energies transmitted by both bodies of gas, and connections for applying the outputs of said detectors jointly to determine the potential of a frequency-control electrode of the first-named oscillator.

LOWELL E. NORTON.

References Cited in the file of this patent

UNITED STATES PATENTS

| Number | Name | Date |
|---|---|---|
| 2,425,657 | Tunick | Aug. 12, 1947 |
| 2,462,294 | Thompson | Feb. 22, 1949 |
| 2,470,892 | Hepp | May 24, 1949 |
| 2,475,074 | Bradley | July 5, 1949 |
| 2,555,150 | Norton | May 29, 1951 |
| 2,591,257 | Hershberger | Apr. 1, 1952 |